G. W. COLE.
CLOSURE FOR RECEPTACLES.
APPLICATION FILED FEB. 21, 1908.

977,932.

Patented Dec. 6, 1910.

UNITED STATES PATENT OFFICE.

GEORGE W. COLE, OF ENGLEWOOD, NEW JERSEY.

CLOSURE FOR RECEPTACLES.

977,932.   Specification of Letters Patent.   Patented Dec. 6, 1910.

Application filed February 21, 1908. Serial No. 416,985.

*To all whom it may concern:*

Be it known that I, GEORGE W. COLE, a citizen of the United States, residing at Englewood, in the county of Bergen and State of New Jersey, have invented new and useful Improvements in Closures for Receptacles, of which the following is a specification.

My invention relates to improvements in closures for receptacles, and particularly to stoppers for oil or other fluid receptacles and dispensing cans.

It has for its object to provide a combined stopper and spout, the spout or tube being partially embedded in the stopper and normally closed by the stopper, but capable of being opened with facility to allow the discharge of the contents of a receptacle through the spout.

A further object is to provide a stopper with a tapering spout, a portion of the spout extending outside of the stopper and the remainder of the spout being so embedded in the stopper as to unite them securely together, so that they cannot be easily separated and whereby the stopper may be extracted by using the spout as a handle.

To the accomplishment of the foregoing and such other objects as may hereinafter appear, my invention consists in certain constructions and combinations of parts hereinafter described and particularly pointed out in the claims, reference being had to the accompanying drawings forming a part hereof and in which—

Figure 1:
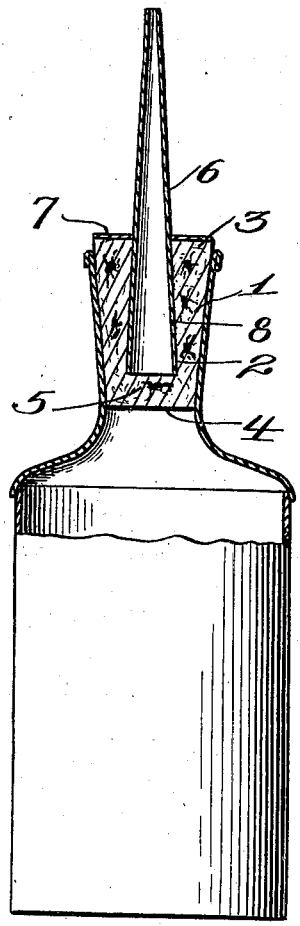
Figure 2:
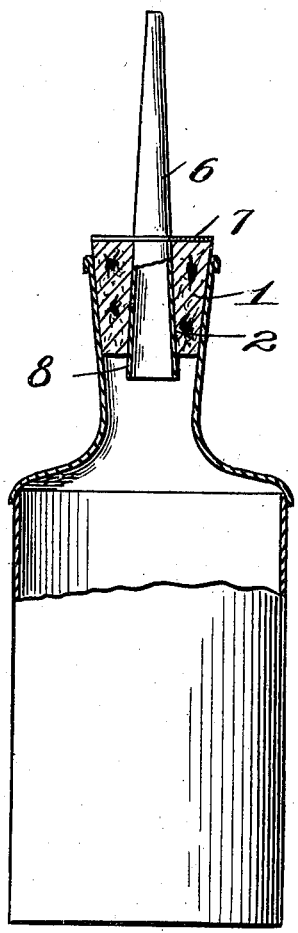

Figure 1 is a side elevation with parts in section of my improved stopper and spout applied to a receptacle, the spout being closed by the stopper; and Fig. 2 is a side elevation with parts in section of my improved stopper and spout applied to a receptacle, the spout being open by having a portion of the stopper removed.

In the drawings, the numeral 1 designates the stopper, proper, which may be made of any suitable material, but preferably of cork, and which is adapted to fit in and close the discharge opening of a receptacle as shown. This stopper is formed with a longitudinal recess or cavity 2 extending only partially therethrough, from the outer end 3 toward the inner or lower end 4, leaving a portion 5 of the stopper imperforate, so that the receptacle may be entirely closed by the stopper. The lower portion 8 of a tapering spout 6, is greater in diameter than the upper portion and fits into the recess or cavity 2, the latter being somewhat smaller in diameter than the larger end of the spout. This recess or cavity 2 is preferably cylindrical in form but may be tapering either inwardly or outwardly. Secured to the spout 6, by soldering, swaging, or other means, is the disk or washer 7, so positioned thereon that when the lower and larger portion 8 of the spout is in position in the recess or cavity 2, said disk will bear and rest against the upper and outer surface of the stopper.

In making the complete closure, the recess or cavity is formed in the cork stopper and then the lower portion or that portion of the spout having the greater circumferential dimension is inserted into the cavity or recess until the disk bears against the outer surface of the stopper. In pushing the lower end or the end of the tapering spout of the greatest diameter into its position, the cork about the wall of the recess or cavity is pressed or pushed outwardly and consequently compressed. The particles of cork, after the passage of the section of the spout of largest diameter, immediately tend to press inwardly or contract and consequently grip or hug with a constant pressure the tapering walls of the spout, and the part of the spout adjacent to its end is held by the pressure of the compressed cork, so that the embedded portion of the spout is held so firmly as to prevent its easy withdrawal from engagement with the stopper.

In use the combined stopper and spout is secured in the receptacle, the end of the spout being closed by a portion of the stopper and the stopper closing the receptacle. The user opens the receptacle by removing the stopper. The imperforate portion of the stopper is removed by cutting, breaking or other means so as to expose and uncover the inner end of the spout and then the remainder of the stopper with the spout is replaced in the discharge opening of the receptacle. The oil or other contents of the receptacle can now be discharged through said spout.

By having the spout tapered and embedded in the cork stopper it is positively and entirely closed by said stopper and held firmly therein by the reaction of the cork after compression, and allows the spout to be used as a means for the withdrawal of the stopper without danger of separating or withdrawing from the stopper. In using on an oil can and applying oil to the parts to be lubricated, if pressure be applied to the point of the spout, the disk prevents the spout from being pushed from the stopper into the receptacle.

In this construction, the receptacle is entirely closed by the combined spout and stopper and there is no opportunity for the accidental escape of the contents, the imperforate portion of the stopper effectually preventing the discharge of the contents by inverting or turning over the receptacle before it is desired to use its contents. This imperforate portion is easily broken or cut off so as to uncover and expose the end of the embedded portion of the spout and the receptacle is ready to be used as an oil can or other liquid dispensing device. This device is a simple, efficient, practical and commercial improvement in this line.

While I have shown the device in Fig. 1 with the spout projecting outwardly and its use in this way is advantageous in that it enables the purchaser to see that he is getting a spout with the receptacle, the device may be used as a reversible closure by making the outer sides of the cork straight or barrel-shaped and inserting the device with the spout projecting into the receptacle until ready for use when the imperforate portion is removed and the device re-inserted with the spout projecting outwardly.

Having described my invention and set forth its merits, what I claim is:—

1. The combination with a stopper having recessed and imperforate portions, of a tapered spout partially embedded in said recessed portion of the stopper and having one end closed by said imperforate portion of the stopper and the other end extending outside the stopper, the wall of the recess conforming to the tapered outline of the spout to resist the outward withdrawal of the spout from the stopper, substantially as described.

2. The combination with a stopper having a recess formed therein and an imperforate portion, of a tapered tubular spout, one end of said spout being embedded in said recess and closed by said imperforate portion, and a disk secured to said spout and adapted to bear against the outer surface of the stopper, substantially as described.

3. The combination with a stopper having a recess formed therein from the top toward the lower portion and having the lower portion imperforate, of a tapered tubular spout, the portion of greatest circumferential dimension being embedded in said recess and its end closed by said imperforate lower portion of the stopper, said spout having a disk secured thereto and adapted to bear against the outer and upper surface of the stopper, the lower portion of said stopper being adapted to be severed and removed to uncover and expose the open end of the embedded portion of the spout, substantially as described.

GEORGE W. COLE.

Witnesses:
HERMAN GUSTOW,
KATHERINE M. KILEY.